United States Patent [19]

Tomlinson

[11] Patent Number: 4,503,731
[45] Date of Patent: Mar. 12, 1985

[54] A.F.C. DRIVE GEARBOX

[75] Inventor: James E. Tomlinson, Pog Moor, England

[73] Assignee: Anderson Strathclyde PLC, Glasgow, Scotland

[21] Appl. No.: 377,201

[22] PCT Filed: Sep. 14, 1981

[86] PCT No.: PCT/GB81/00188

§ 371 Date: May 6, 1982

§ 102(e) Date: May 6, 1982

[87] PCT Pub. No.: WO82/01050

PCT Pub. Date: Apr. 1, 1982

[51] Int. Cl.³ .............. F16H 57/02; F16H 37/06; E21C 27/32
[52] U.S. Cl. .................. 74/606 R; 74/661; 74/421 A; 299/34; 299/43
[58] Field of Search .......... 74/606 R, 661, 416, 74/417, 420, 421 R, 421 A, 423, 424, 15.2, 15.8, 15.6; 198/834, 606, 607; 299/43, 34

[56] References Cited

U.S. PATENT DOCUMENTS

| 2,548,182 | 4/1951 | Wagner | 74/15.2 |
| 2,810,565 | 10/1957 | Dommann | 74/661 X |
| 2,918,825 | 12/1959 | Bade | 74/421 R X |
| 3,029,661 | 4/1962 | Schmitter | 74/467 X |
| 3,033,542 | 5/1962 | Rosler | 299/34 |
| 3,798,991 | 3/1974 | Kime et al. | 74/417 |
| 3,864,990 | 2/1975 | Lacoste | 74/606 R |
| 4,159,851 | 7/1979 | Rosler | 74/606 R |

FOREIGN PATENT DOCUMENTS

| 952252 | 2/1953 | Fed. Rep. of Germany . |
| 1277186 | 9/1968 | Fed. Rep. of Germany ........ 299/43 |
| 1932624 | 1/1971 | Fed. Rep. of Germany . |
| 2659479 | 7/1977 | Fed. Rep. of Germany . |
| 1236951 | 6/1960 | France . |
| 1404170 | 5/1965 | France . |
| 2378218 | 8/1978 | France . |
| 296583 | 5/1965 | Netherlands ......................... 299/34 |
| 297430 | 11/1965 | Netherlands ......................... 299/34 |

Primary Examiner—Allan D. Hermann
Assistant Examiner—Arthur T. Quiray
Attorney, Agent, or Firm—Mason, Fenwick & Lawrence

[57] ABSTRACT

The drive gearbox comprises an in-line primary box, a right-angled primary box and a nose module which can be coupled to one or both primary boxes. Each primary box has an open-ended interface which exposes gearing and the nose module has two open interfaces which expose gearing when the primary boxes are coupled to the nose modules, the gearings mesh with the gearing.

If only one primary box is coupled to the nose module, a cover (not shown) is placed over the open interface.

A gearbox formed of nose module and one or both primary boxes are advantageous in several ways, such as adaptability, power capacity, shape and size and design.

3 Claims, 13 Drawing Figures

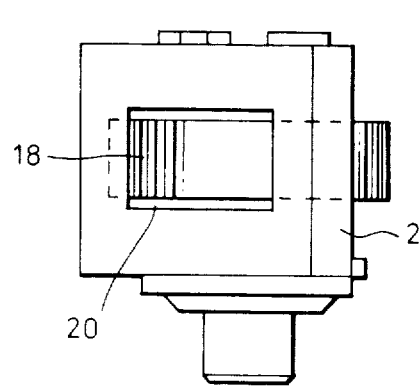
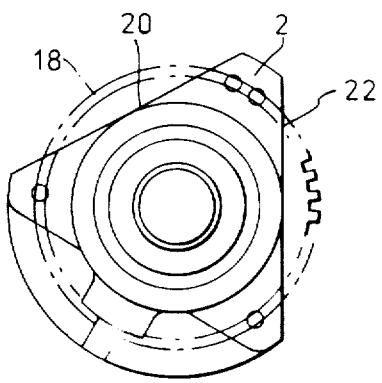
Fig. 2.   Fig. 2A.
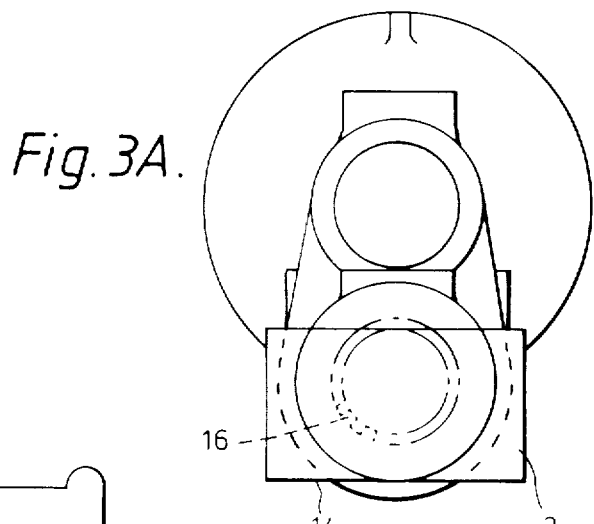
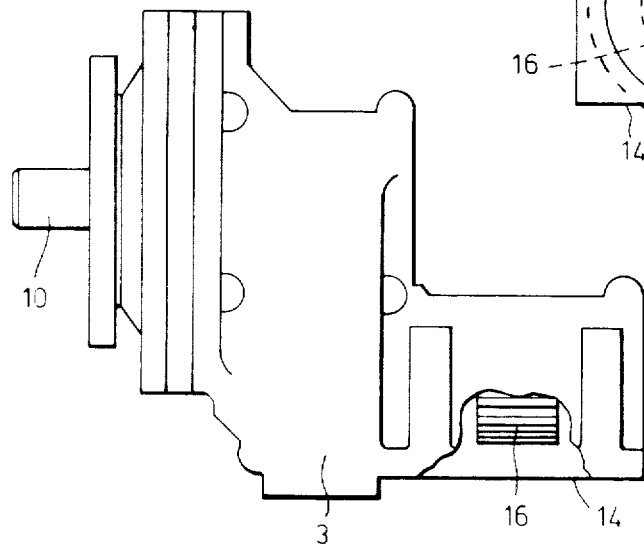
Fig. 3.   Fig. 3A.

A.F.C. DRIVE GEARBOX

This invention relates to drive gearboxes for an armoured face conveyor (A.F.C.).

An A.F.C. has a limited number of positions where a drive unit can be sited (normally 2 to 3). With increasing power demands up to 1200 hp maximum, gearbox capacities are of the order of 500 hp, although 300 hp should be sufficient for the majority of installations.

To date this has led to gearboxes being excessively over-engineered.

The two common gearbox shapes suffer characteristic problems.

(a) An in-line gearbox extends the front line of powered supports away from the face and consequently width is important. A 500 hp unit would necessarily be much wider than the proposed drive gearbox.

(b) A right-angled gearbox suffers from the out-of-balance weight of the overhung motor and coupling. Again this problem is obviously increased by the use of a larger 500 hp motor.

An object of the present invention is to obviate or mitigate the aforesaid disadvantages.

The terminology "in-line" and "right-angled" in the field of A.F.C. Conveyors refers to the position of the gearbox relative to the conveyor and not the position of the input shaft relative to the output shaft.

It should be noted that only after coupling the gearbox or each primary box to the nose module are the gearboxes described as "right-angled" or "in-line".

According to the present invention, there is provided a drive gearbox adaptable as an in-line gearbox or a right angled gearbox and characterised by an in-line primary box, a right-angled primary box and a nose module output section which is coupled to at least one of said primary boxes, each box having an open-ended interface which exposes the gearing which engages gearing of the nose module, and said module having two open interfaces so as to be capable of being coupled to one or both primary boxes and cover means to enclose the open interface when only one primary bos is coupled to the module.

An embodiment of the present invention will now be described, by way of example, with reference to the accompanying drawings, in which:

FIG. 2 is a plan view and

FIG. 2A is a side view of a nose module according to the invention;

FIG. 3 is an end view and

FIG. 3A is a side view of a right-angled primary box according to the invention;

Figure 1:
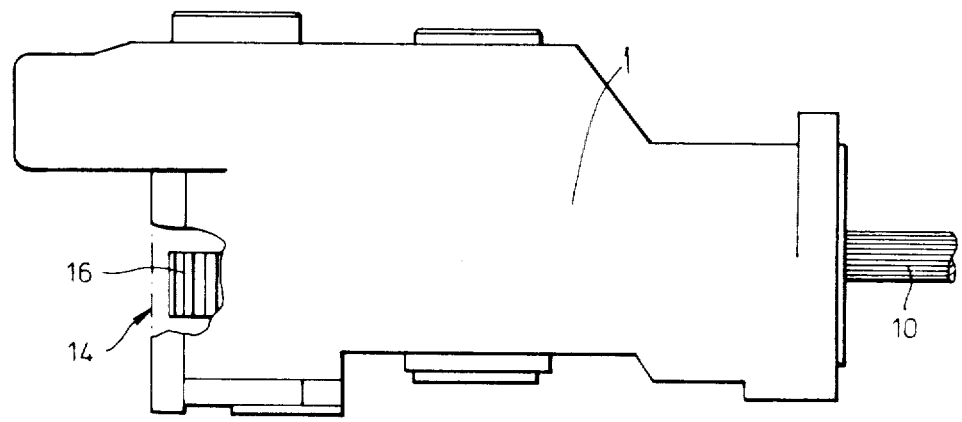
FIG. 1 is a plan view.
Figure 1A:
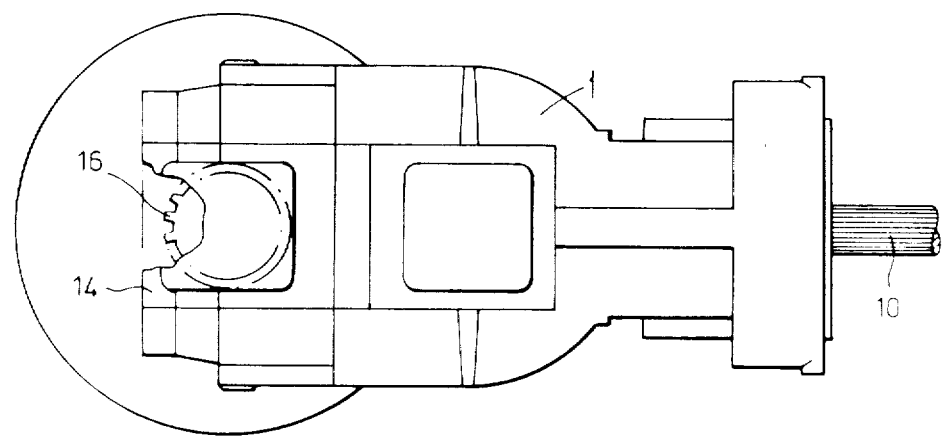
FIG. 1A is a view of an in-line primary box according to the invention.
Figure 4:
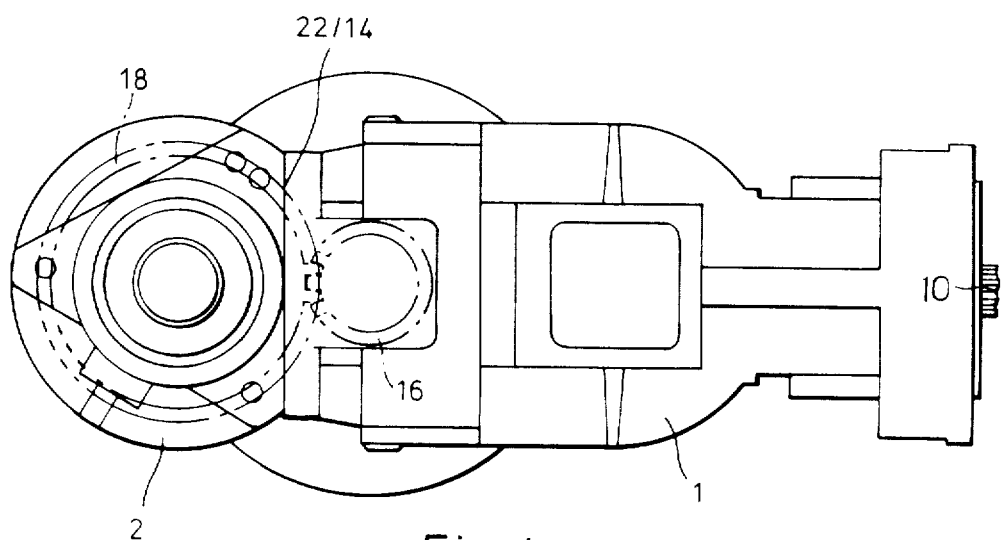
FIG. 4 is a side view.
Figure 4A:
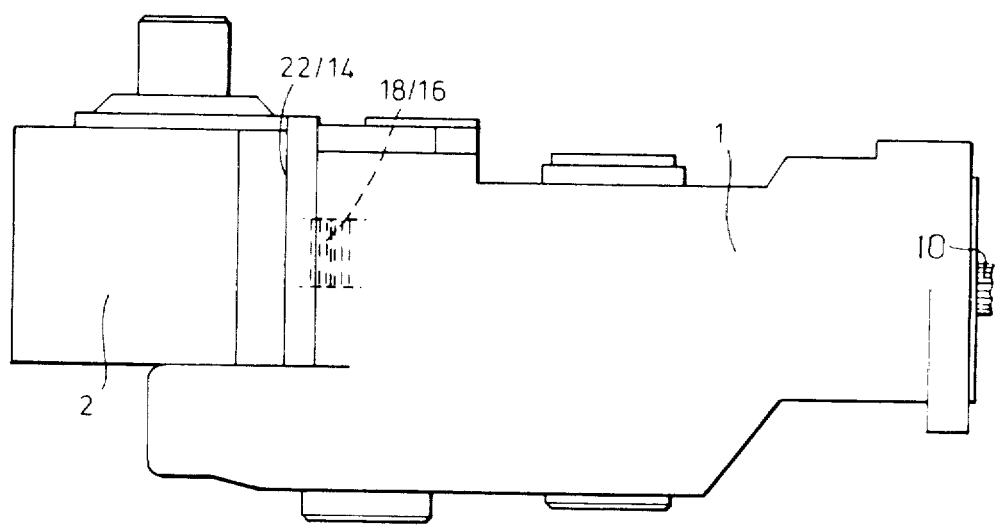
FIG. 4A is a plan view of a nose module coupled to an in-line primary box.
Figure 5A:
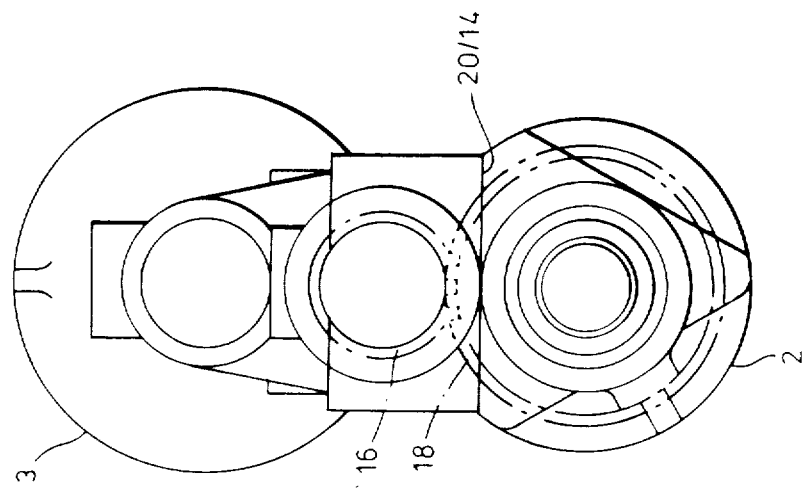
FIG. 5A is a side view of a nose module coupled to a right-angled primary box.
Figure 5:
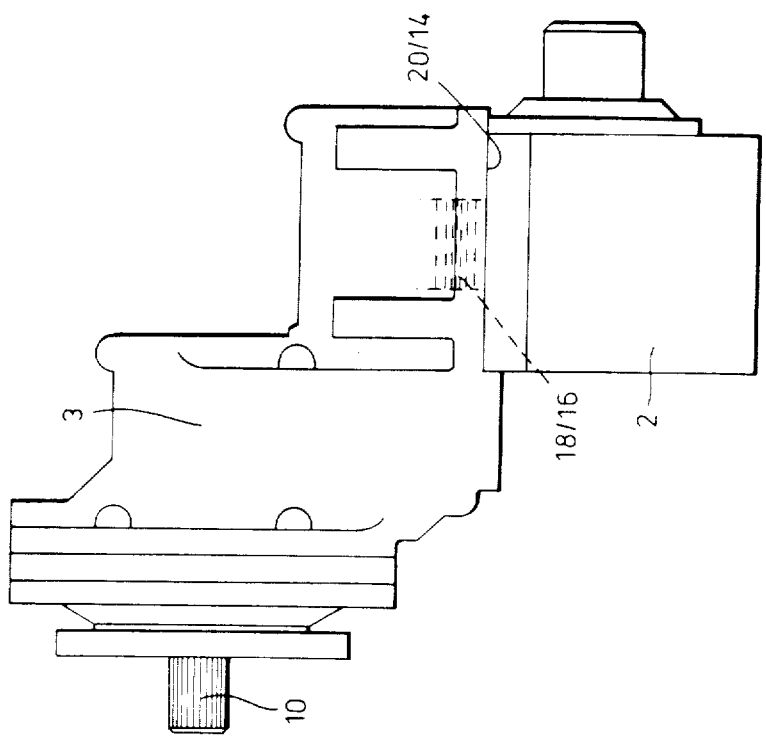
FIG. 5 is an end view.
Figure 6:
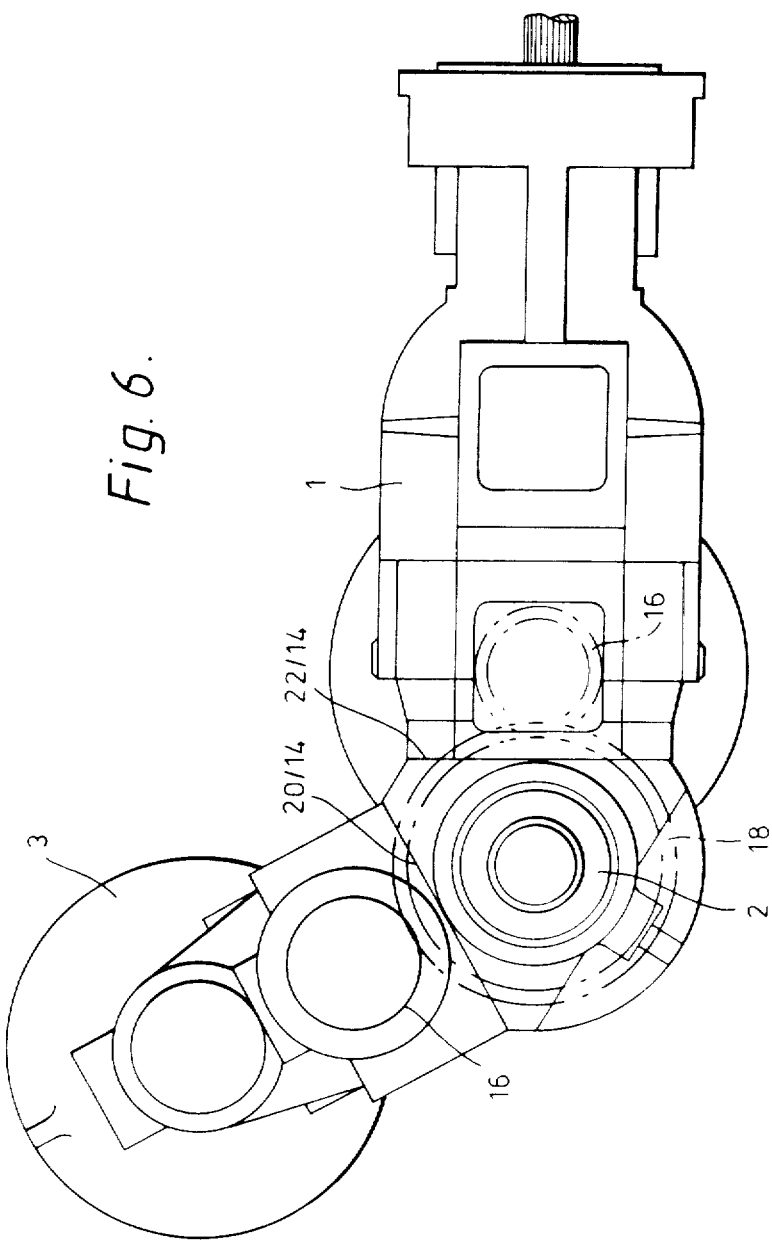
FIG. 6 is a side view of a nose module coupled to a right-angled primary box and an in-line primary box.

Referring to the drawings, a drive gearbox is formed of two supplementary transmission casing, namely an in-line primary box 1 (FIG. 1) a rightangled primary box 3 (FIG. 3) and an output casing in the form of a nose module output section 2 (FIG. 2) which is coupled to one or other or both of the primary boxes (FIGS. 4 to 6).

Each primary box 1, 3 has an input shaft 10 extending from one end for coupling to a motor 12 (FIG. 7) and the other end of each box 1, 3 has an open interface 14 which reveals output gearing 16 for coupling to the gearing 18 of the nose module.

The nose module includes a substantially triangular configuration of which two adjacent sides form open interfaces 20, 22 which reveal the gearing 18, the open interfaces being disposed in planes at an acute angle to each other. A cover (not shown) is provided to cover one of the interfaces when the nose module is coupled to only one primary box 1 or 3.

The nose module 2 can be coupled to either one of the primary boxes 1 or 3, as shown in FIGS. 4 and 5. When the nose module 2 is coupled to the in-line primary box 1, the gearbox formed thereby lies horizontal with its longitudinal axis in line with that of the conveyor; whereas, the gearbox formed by coupling the nose module to a right-angled primary box 3, although also lying horizontal, has its longitudinal axes lying normal to that of the conveyor.

If the nose module is coupled to both 300 hp primary boxes 1, 3 (FIG. 6) a 500 hp dual drive is produced.

Figure 7:
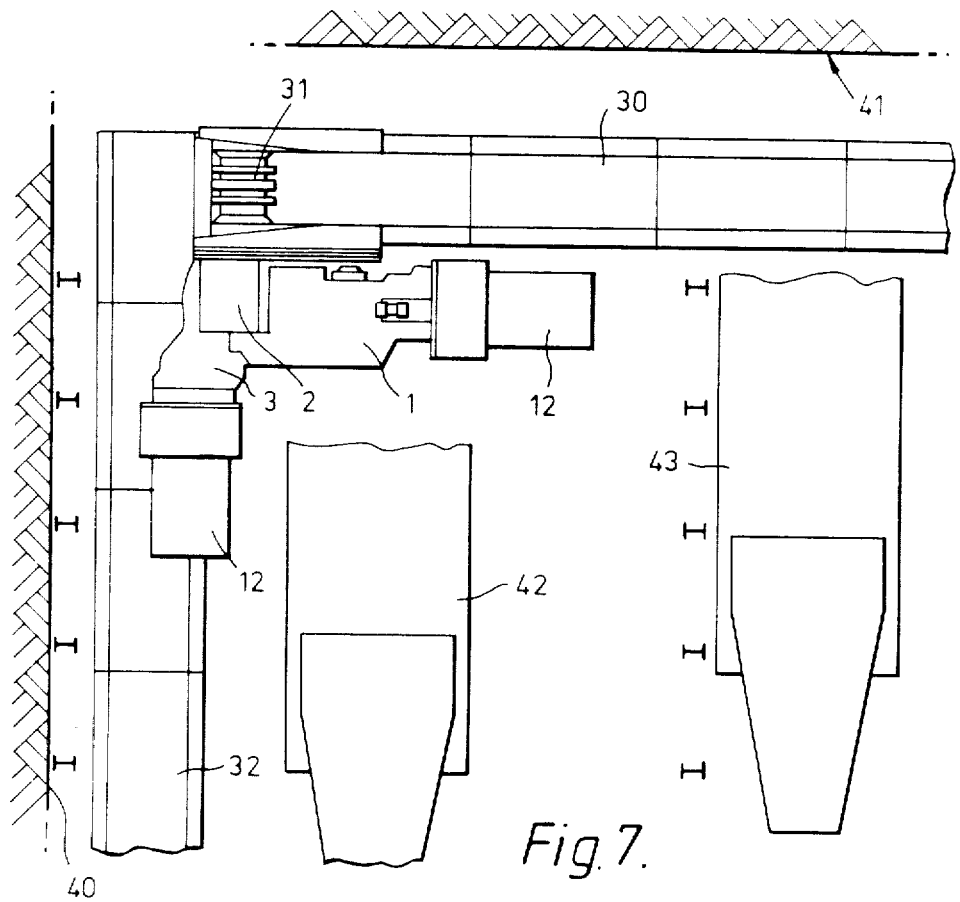
FIG. 7 is a plan view.
Figure 7A:
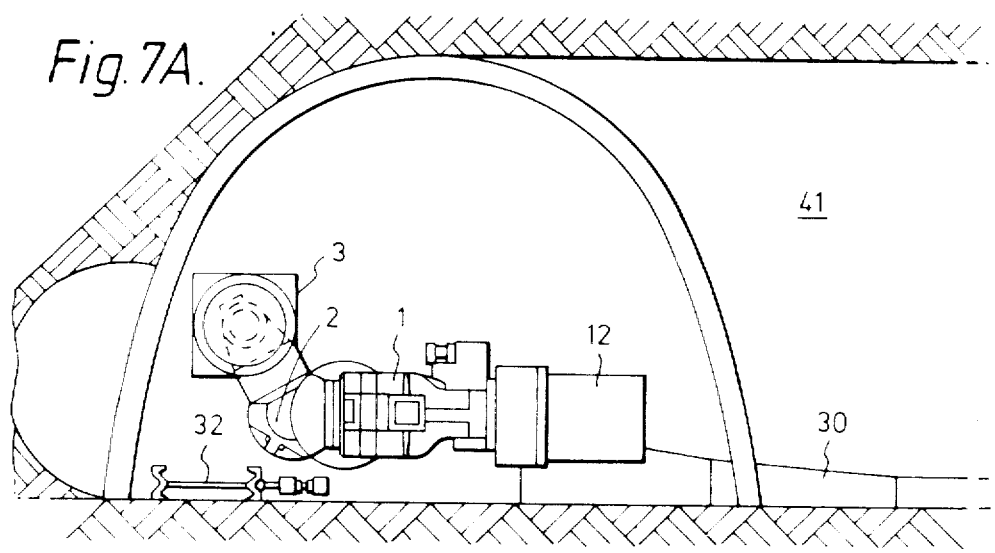
FIG. 7A is a side view of the gearbox of the FIGS. 6 and 6A in situ.

The reason for the acceptable loss of 100 hp is due to the configuration of the formed gearbox, wherein the in-line box lies horizontally while the right-angled box extends upwards from the nose module. The raised position of the right-angled box is necessary, however, when the gearbox is located at the junction of two conveyors as illustrated in FIGS. 7 and 7A; the in-line box 1 lies alongside one conveyor 30 and the nose module output shaft drives the conveyor drum 31. The right-angled box 3 extends above the other conveyor 32 and thus does not obstruct that conveyor. In addition, the angle at which the right-angled box lies reduces the overall length of the formed gearbox and allows the nose module to be placed nearer to the side wall 40 of the tunnel. The face being mined is numbered 41; 42, 43 are roof supports.

If a higher horse power output is required for, say conveyor 30, a second formed gearbox similar to that shown in FIGS. 6 and 7 can be located at the other end of the conveyor to drive a second drum. This will give a combined horsepower of 1000.

A gearbox formed by combining a nose module with one or any combination of both primary boxes as hereinbefore described is advantageous in several ways;

(1) Adaptability

A number of different gearbox shapes are available using standard components both at the initial installation and for subsequent re-use on later faces, where requirements may have changed.

(2) Power Capacity

Having a dual drive facility means that the gearbox unit size is not excessively overengineered for the 300 hp application.

(3) Size/shape

The dual drive concept using a combined rightangled and in-line gearbox offers a shape with elements no larger than existing gearboxes and should present no extra problems of support, or out-of-balance (see FIG. 7).

(4) Design

There are several advantages of design with a dual drive system:

(a) Gear and bearing loads can be reduced on the final reduction train by the dual input from opposing sides.

(b) Because the gearbox is symmetrical about its length and split transversely handability problems are eased. One consequence is that the output shaft need only protrude from one side of the output shaft and enable greater gear reduction on the primary gear trains.

I claim:

1. A drive gearbox for use in driving an armoured face conveyor adaptable as an in-line gearbox wherein the gearbox has a main axis parallel with the conveyor and adaptable as a right angled gearbox wherein the main axis of the gearbox lies at right angles to the conveyor, said drive gearbox comprising an output casing having interfaces which expose gearing for optional attachments and cover means to close off an interface not in use, and a plurality of supplementary transmission casings for attachment to the output casing also having an open interface exposing gearing, the supplementary transmission casing being a primary box having an input shaft and an output gearing, the output gearing having an axis at right angles to the input shaft thereof for coupling to the output casing to form an in-line gearbox, and a right-angled primary box having an input shaft and an output gearing, the output gearing having an axis parallel with the input shaft thereof for coupling to the output casing to form a right angled gearbox, at least one of which primary boxes is coupled to the output casing to form one of an in-line gearbox and a right-angled gearbox, and the open interfaces of the output casing being disposed in planes at an acute angle relative to each other.

2. A gearbox as claimed in claim 1 wherein the output casing includes a substantially triangular configuration of which two adjacent sides form the open interfaces.

3. A gearbox as claimed in claim 1 or 2 wherein the input shaft of each primary box extends from one end for coupling to a motor and the other end of each box has the open interface which reveals the gearing for coupling to the gearing of the output casing.

* * * * *